(12) United States Patent
Jayaraman et al.

(10) Patent No.: US 9,990,267 B2
(45) Date of Patent: *Jun. 5, 2018

(54) MOBILE DEVELOPMENT PLATFORM IN A CLOUD BASED ARCHITECTURE

(71) Applicant: Parse Inc., Menlo Park, CA (US)

(72) Inventors: Shyamsundar Jayaraman, San Mateo, CA (US); Henele Litaka Adams, San Francisco, CA (US); Bryan Jay Klimt, Jr., San Mateo, CA (US); Kevin David Lacker, Berkeley, CA (US); Charity Hope Majors, San Francisco, CA (US); David Eitan Poll, Mountain View, CA (US); Ilya Sukhar, San Francisco, CA (US); James Jacob Yu, San Francisco, CA (US)

(73) Assignee: PARSE INC., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/878,494

(22) Filed: Oct. 8, 2015

(65) Prior Publication Data

US 2016/0070635 A1 Mar. 10, 2016

Related U.S. Application Data

(63) Continuation of application No. 14/268,560, filed on May 2, 2014, now Pat. No. 9,189,376, which is a
(Continued)

(51) Int. Cl.
*H04L 29/06* (2006.01)
*G06F 11/36* (2006.01)
*G06F 21/51* (2013.01)
*G06F 21/53* (2013.01)
*H04L 29/08* (2006.01)
(Continued)

(52) U.S. Cl.
CPC ............ *G06F 11/3604* (2013.01); *G06F 8/30* (2013.01); *G06F 8/61* (2013.01); *G06F 9/547* (2013.01); *G06F 11/0709* (2013.01); *G06F 11/0757* (2013.01); *G06F 11/3688* (2013.01); *G06F 21/51* (2013.01); *G06F 21/53* (2013.01); *H04L 63/08* (2013.01); *H04L 67/1002* (2013.01)

(58) Field of Classification Search
CPC ....................................... G06F 21/51
USPC ............................................. 726/22
See application file for complete search history.

(56) References Cited

U.S. PATENT DOCUMENTS

2013/0074046 A1* 3/2013 Sharma ............... G06F 11/3688
717/126
2013/0097706 A1* 4/2013 Titonis ................... G06F 21/56
726/24

* cited by examiner

*Primary Examiner* — Longbit Chai

(57) ABSTRACT

Embodiments are directed towards mobile application development in a cloud-based architecture. Mobile applications may be designed to communicate with a cloud platform over a network. Mobile application developers may be enabled to submit cloud code to cloud platforms for use by mobile applications. If cloud code is provided to a cloud platform, the cloud platform may perform one or more actions to authenticate the cloud code, such as, ensuring that that the user providing the cloud code is authorized to provide the cloud code. If the cloud code is authenticated the cloud platform may perform one or more actions to validate the cloud code. If validated, the cloud code may be activated for use by mobile applications and/or mobile application developers. Activation of the cloud code may include associating the cloud code with one or more function calls and/or with one or more trigger points.

20 Claims, 10 Drawing Sheets

Related U.S. Application Data continuation of application No. 13/829,771, filed on Mar. 14, 2013, now Pat. No. 8,739,282.

(51) Int. Cl.
*G06F 9/44* (2018.01)
*G06F 11/07* (2006.01)
*G06F 9/445* (2018.01)
*G06F 9/54* (2006.01)

MOBILE DEVELOPMENT PLATFORM IN A CLOUD BASED ARCHITECTURE

CROSS-REFERENCE TO RELATED APPLICATIONS

The present application claims benefit of U.S. patent application Ser. No. 14/268,560, entitled "Mobile Development Platform in a Cloud Based Architecture" and filed May 2, 2014, which is specifically incorporated by reference for all that it discloses and teaches.

TECHNICAL FIELD

This invention relates generally to mobile application development in a cloud-based architecture, and more particularly, but not exclusively, to deploying mobile application code in a cloud-based environment.

BACKGROUND

As the popularity and complexity of mobile applications has increased, more mobile applications use application platforms to provide scalable functionality for their mobile applications. Application platforms may provide remote functionality, remote storage, or the like, that mobile applications may interact with over a network. In some cases, networks linking mobile applications and application platforms may be slow and/or unreliable. As a result, mobile application performance may suffer if interactions between mobile applications and application platforms increase in number and complexity.

Furthermore, as the complexity of mobile applications increases some may require custom services that may be difficult for an application platform to provide. If an application platform lacks sufficient features, mobile applications may be required to implement the feature locally on the mobile devices. Performing the additional tasks that may be required for complex applications at the mobile devices may require the use of more resources on the mobile device and increased network transactions between the mobile device and the application platform. Thus, it is with respect to these considerations and others that the present innovations have been made.

DETAILED DESCRIPTION

Figure 1:
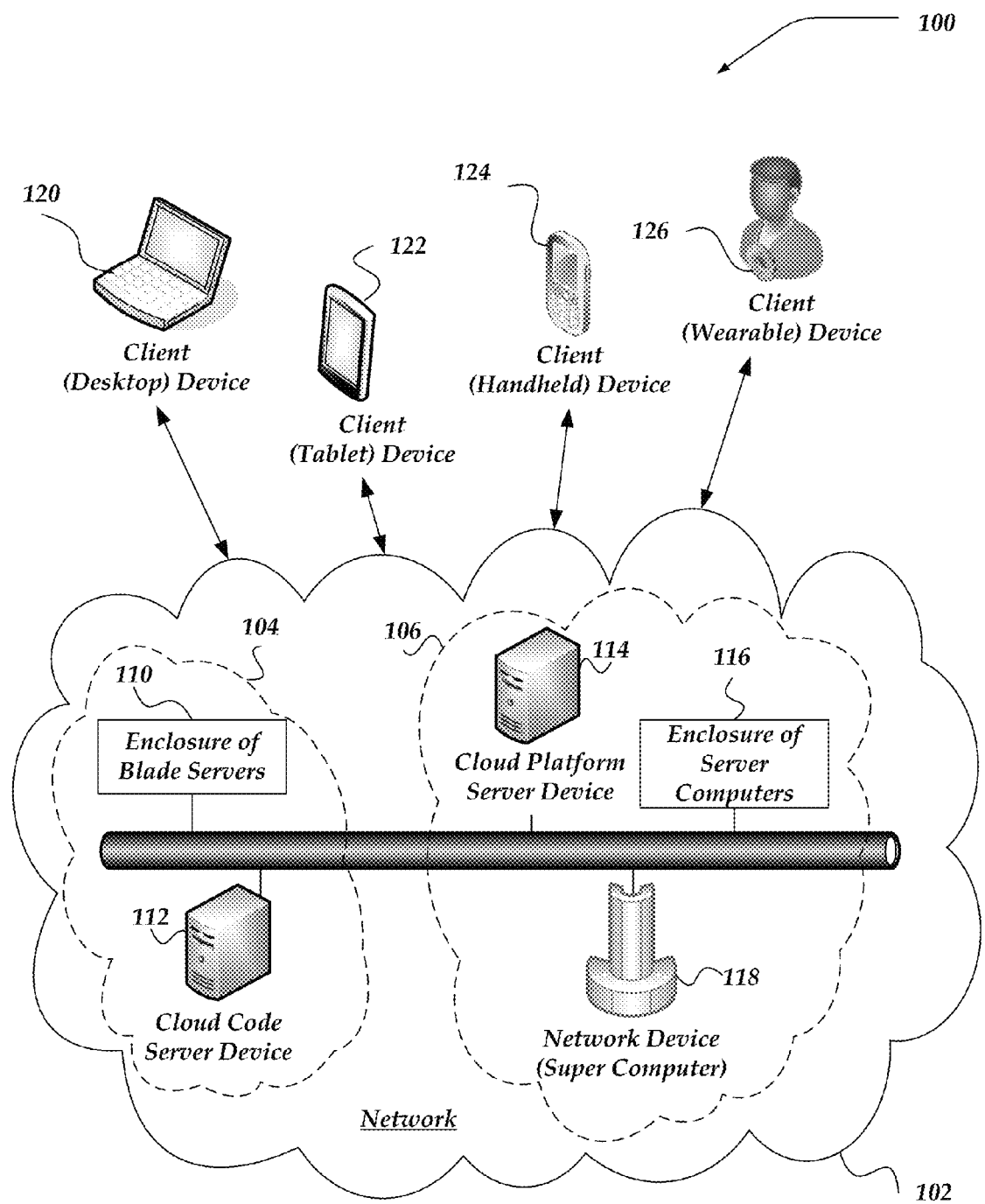
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may.

Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "cloud platform" as used herein refers to an application platform that may provide services that may be used by mobile application developers to simplify the development of their mobile applications. The cloud platform may be accessible over a network by mobile applications operating on mobile devices. The services provided by a cloud platform may vary, but they may provide, offline storage, user databases, support for payment transactions, or the like. In at least one of the various embodiments, cloud platforms may be configured to provide service to general purpose applications in additional to mobile applications. While a cloud platform may be operative in a cloud-based environment, it is not so limited; other well-known operational architectures may be employed.

The term "cloud code," "cloud code module" as used herein refers to selection of software source code that may be provided to the cloud platform by a mobile application developer. Cloud code is a chunk of software that may be custom designed by the mobile application developer for use in one or more mobile application. The cloud code may be deployed to a cloud platform and may be integrated into the cloud platform services and made available one or more mobile applications. Cloud code may be developed using a variety of computer programming languages.

The term "cloud code server" as used herein refers to a server and/or network device that may be configured to execute cloud code modules. Cloud code server may be arranged to include one or more sandboxes for executing cloud code.

The term "sandbox" as used herein refers to a special purpose computing process that may reside on a cloud code server. Sandboxes are designed to execute cloud code in an instrumented and/or monitored runtime environment. They may include restrictions on the resources that may be accessed by the cloud code being executed. In at least one of the various embodiments, sandboxes may be designed to be compatible with one or more computer programming languages.

The term "function call" as used herein refers to a function call made from a within a mobile application directed to services provided by a cloud platform. Mobile application developers may use function calls to access the services provided by cloud platforms. Function calls may correspond to built-in services that are provided by the cloud platform. Also, some function calls may be associated with cloud code. Function calls that are linked to or associated with cloud code may enable actions be performed on a cloud code server.

The term "mobile application" as used herein refers to a computing/software application designed to operate on a mobile device. Mobile applications may include function calls that access services and features provided by a cloud platform. While the term mobile application is used throughout this description, one of ordinary skill in art the will appreciate that other type of applications may benefit from these innovations and are well within the scope and spirit of the disclosed innovations, including, but not limited to, web applications, web pages, "desktop" applications, or the like.

The term "mobile application developer" as used herein refers to users that design and develop mobile applications. Mobile application developers may create and deploy cloud code that may be employed from within mobile application.

Briefly stated, various embodiments are directed towards mobile application development in a cloud-based architecture. In at least one of the various embodiments, mobile applications may be designed to communicate with a cloud platform over a network. In at least one of the various embodiments, mobile application developers may be enabled to submit cloud code to cloud platforms for use by mobile applications. If cloud code is provided to a cloud platform, the cloud platform may perform one or more actions to authenticate the cloud code, such as, ensuring that the user providing the cloud code is authorized to provide the cloud code. If the cloud code is authenticated, in at least one of the various embodiments, the cloud platform may perform one or more actions to validate the cloud code. If validated, the cloud code may be activated for use by mobile applications and/or mobile application developers. Activation of the cloud code may include associating the cloud code with one or more function calls and/or with one or more trigger points.

In at least one of the various embodiments, if the communication from the mobile application includes a function call rather than cloud code, the cloud platform may determine if the provided function call is associated with cloud code or if it is associated with a built-in cloud platform service. If the function call is associated with cloud code, the cloud platform may perform one or more actions to determine a sandbox residing on a cloud code server for executing the cloud code. If a suitable sandbox is available, the cloud platform may provide the cloud code to the sandbox for execution. The results of executing the cloud code in the sandbox may be provided to the mobile application that made the function call.

In at least one of the various embodiments, determining the sandbox for executing the cloud code may include performing one or more load balancing actions among the cloud code servers. In at least one of the various embodiments, cloud code servers may be in communication with the cloud platform and may be updating the cloud platform on their status and sandbox availability.

In at least one of the various embodiments, validating cloud code during deployment may include scanning the contents of the cloud code (e.g., source code) to detect if unsafe code may be included in the cloud code, Unsafe code may include instructions that may cause the problems for other sandboxes, cloud code servers, or the cloud platform. For example, unsafe instruction may include, potentially infinite loops, excessive recursion, attempting to access restricted resources, or the like. In at least one of the various embodiments, unsafe instructions may be determined by looking for known patterns in the source code of the cloud code.

In at least one of the various embodiments, sandboxes may include specially modified system calls that may transparently prevent the cloud code from exceeding resource thresholds. For example, memory allocation system calls may be modified to limit the amount of memory that can be allocation within various scopes, such as, per call, per process, per sandbox, per cloud code server, or the like. Such modifications may impose safety and performance quotes on resources that go beyond the standard features of the programming language/environment used by the cloud code.

In at least one of the various embodiments, one or more watcher processes may be employed to monitor the operations of the sandboxes and/or the cloud code servers. If non-performing sandboxes are discovered the watcher process may cause the sandbox to be reset/restarted. If non-performing cloud code servers are discovered they may be reset and/or rebooted. If function calls linked to cloud code are interrupted by resets, reboots, or timeouts, they may be retried by the cloud platform.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include cloud code server device 112, cloud platform server device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, cloud code server device 112 may include module, processes, components, services, or the like, for executing cloud code using one or more sandboxes, and the like. Further, in at least one of the various embodiments, cloud platform server device 114 may include processes, modules, services, components, or the like, for managing requests and other communications to and from client devices that may be running various client applications, and for providing communications to one or more cloud code server devices, such as cloud code server device 112, and the like. In at least one of the various embodiments, cloud code server device 112 and/or cloud platform server device 114 may be employed to validate cloud code and monitor one or more devices and/or processes that may be provided cloud code for processing. Both cloud code server device 112 and cloud platform server device 114 may perform actions further described in conjunction with FIGS. 5-9.

Also, in at least one of the various embodiments, enclosure of blade serves 110, enclosure of enclosure of server computers 116, super computer network device 118 may include network devices that perform the actions of cloud code server device 112 and cloud platform server device 114.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (Wi-Max), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
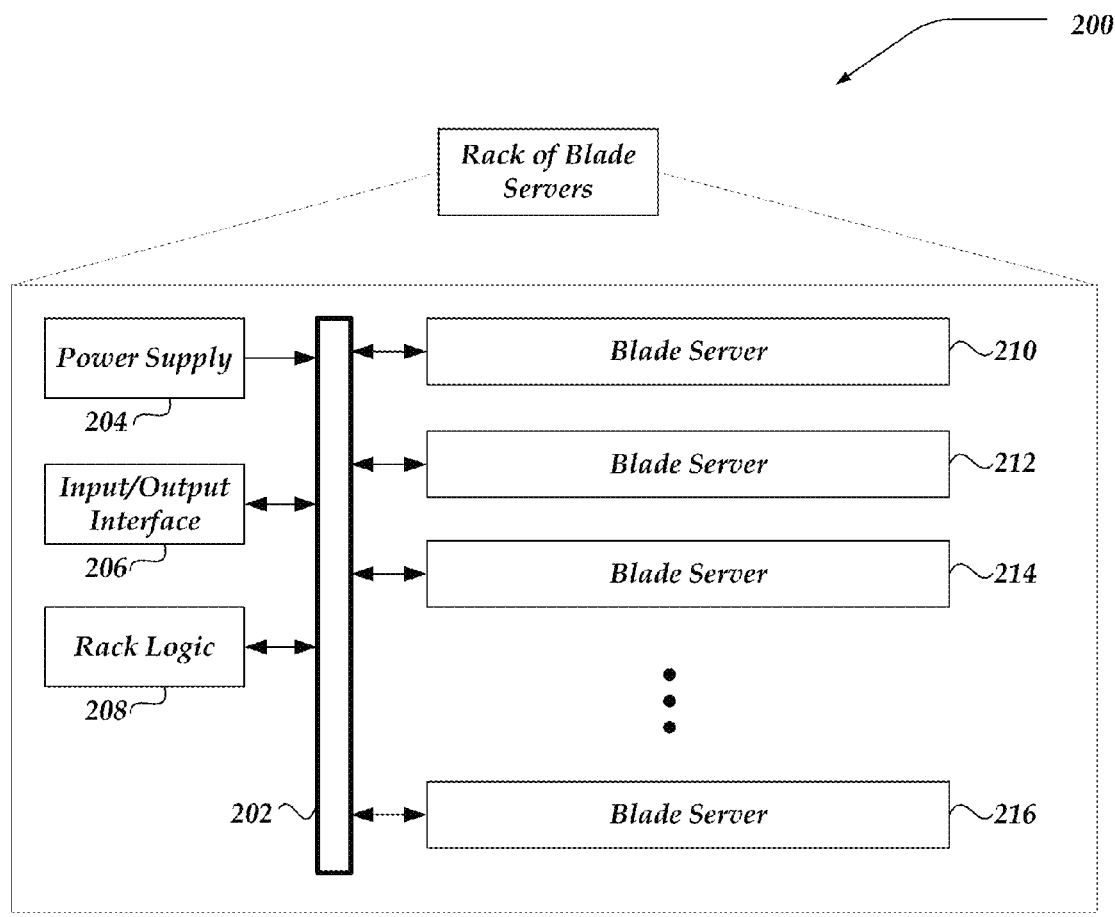
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
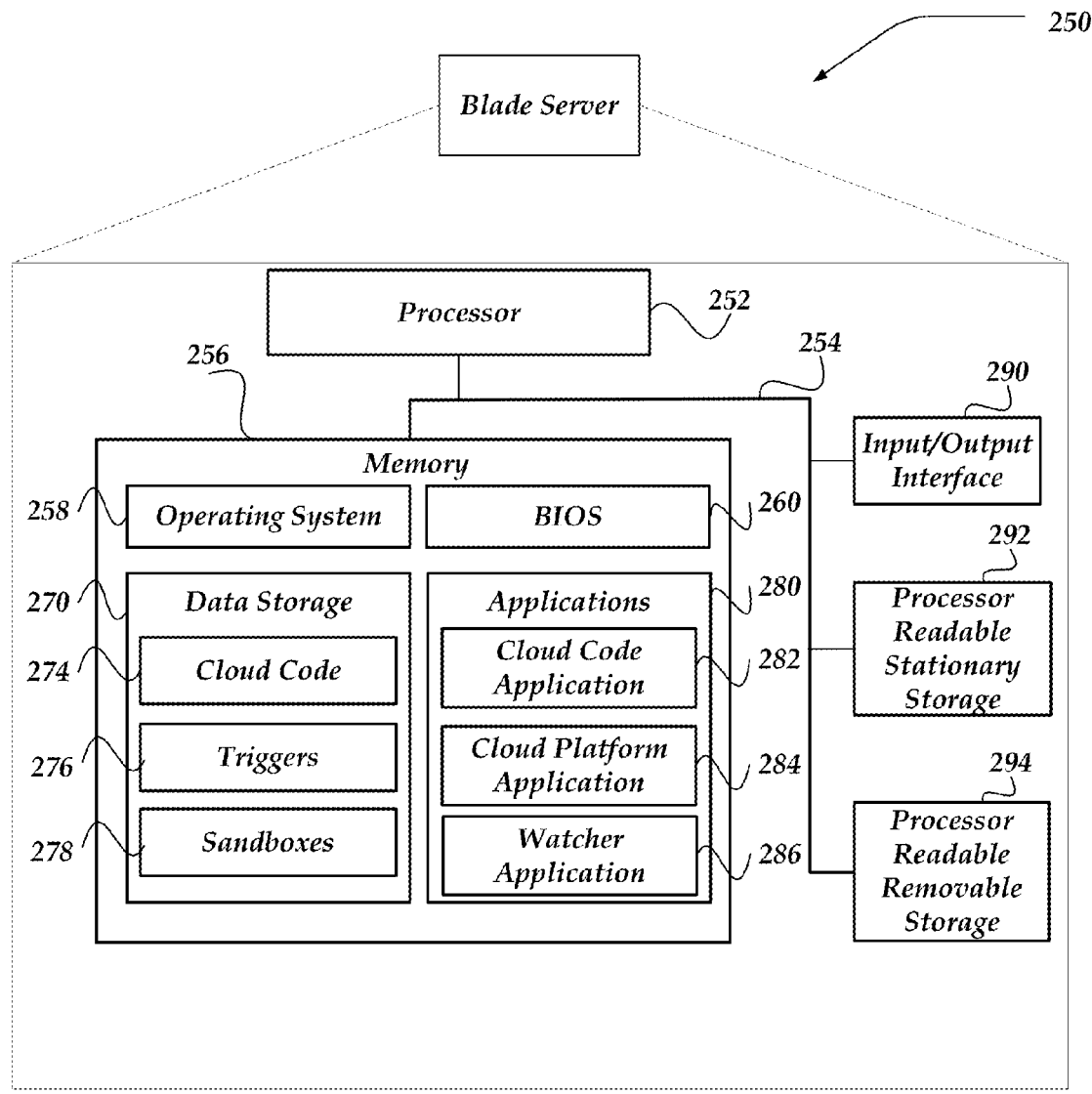
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-9. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, cloud code 274, triggers 276, sandboxes 278, or the like. Cloud code 274 may contain cloud code in source code form and/or compiled form, as well as other supporting data Likewise, triggers 276 may contain triggers and/or trigger point registrations, and other supporting data, arranged in lists, databases, configuration files, or the like. And, sandboxes 278 may contain one or more sandboxes and supporting data.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, cloud code application 282, cloud platform server 284, watcher application 286, which may be enabled to perform actions further described below in conjunction with FIGS. 5-9.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, code application 282, cloud platform server 284, watcher application 286 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment Likewise, in at least one of the various embodiments, virtual machines and/or virtual servers dedicated to running code application 282, cloud platform server 284, watcher application 286 may be provisioned and de-commissioned automatically.

Also, in at least one of the various embodiments, cloud code 274, triggers 276, sandboxes 278, or the like, may be located on virtual servers running in a cloud-based computing environment rather than being tied to one or more specific physical blade servers.

Illustrative Client Device

Figure 3:
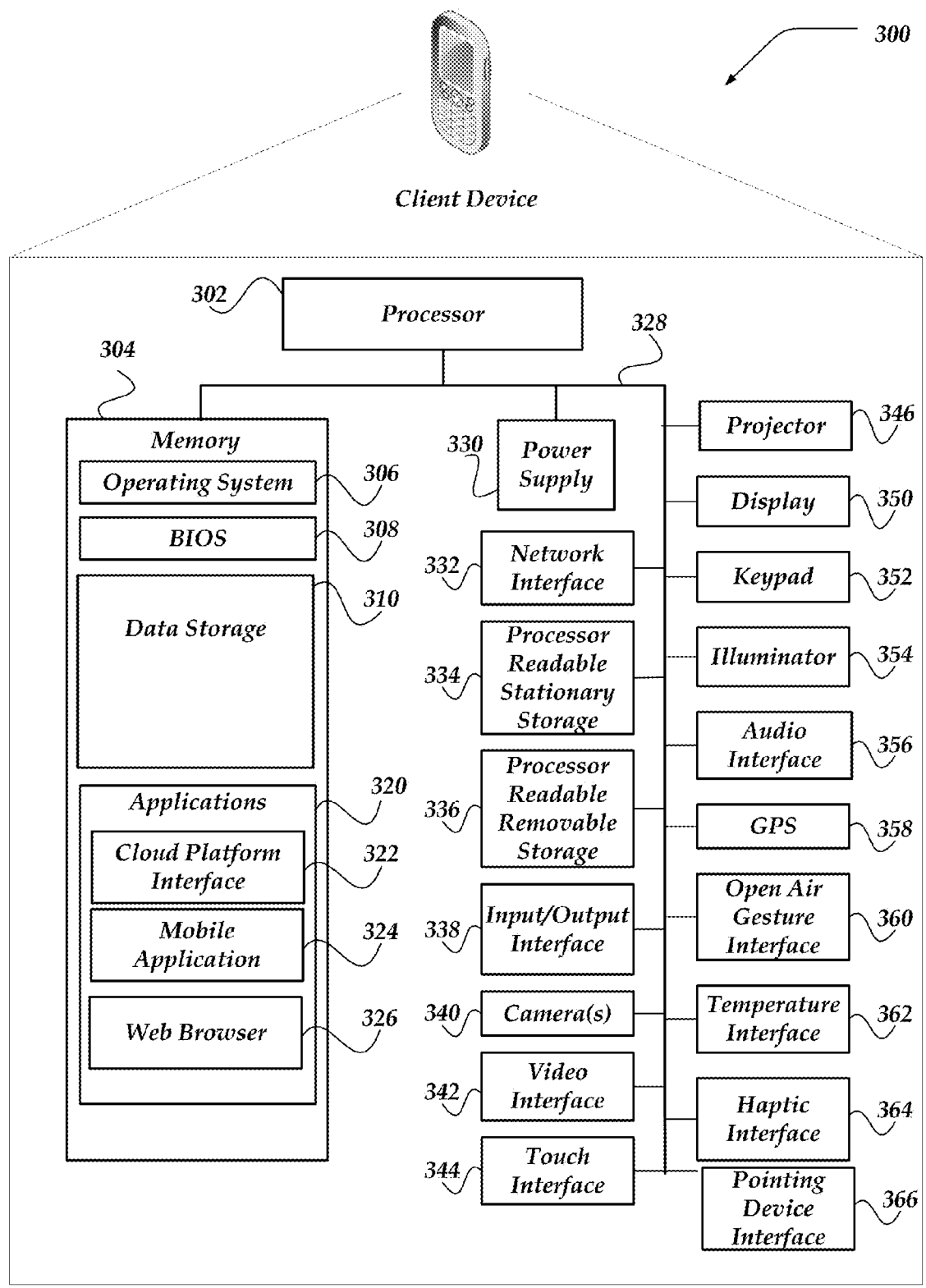
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, cloud platform interface 322. In at least one of the various embodiments, cloud platform interface 322 may be used to exchange communications to and from cloud platform server device 114 and/or cloud code device 112, including, but not limited to, queries, searches, API calls, or the like. Mobile application 324 may provide various application services for users and it may employ cloud platform interface 322 to communicate with cloud code server device 112 and cloud platform server device 114.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
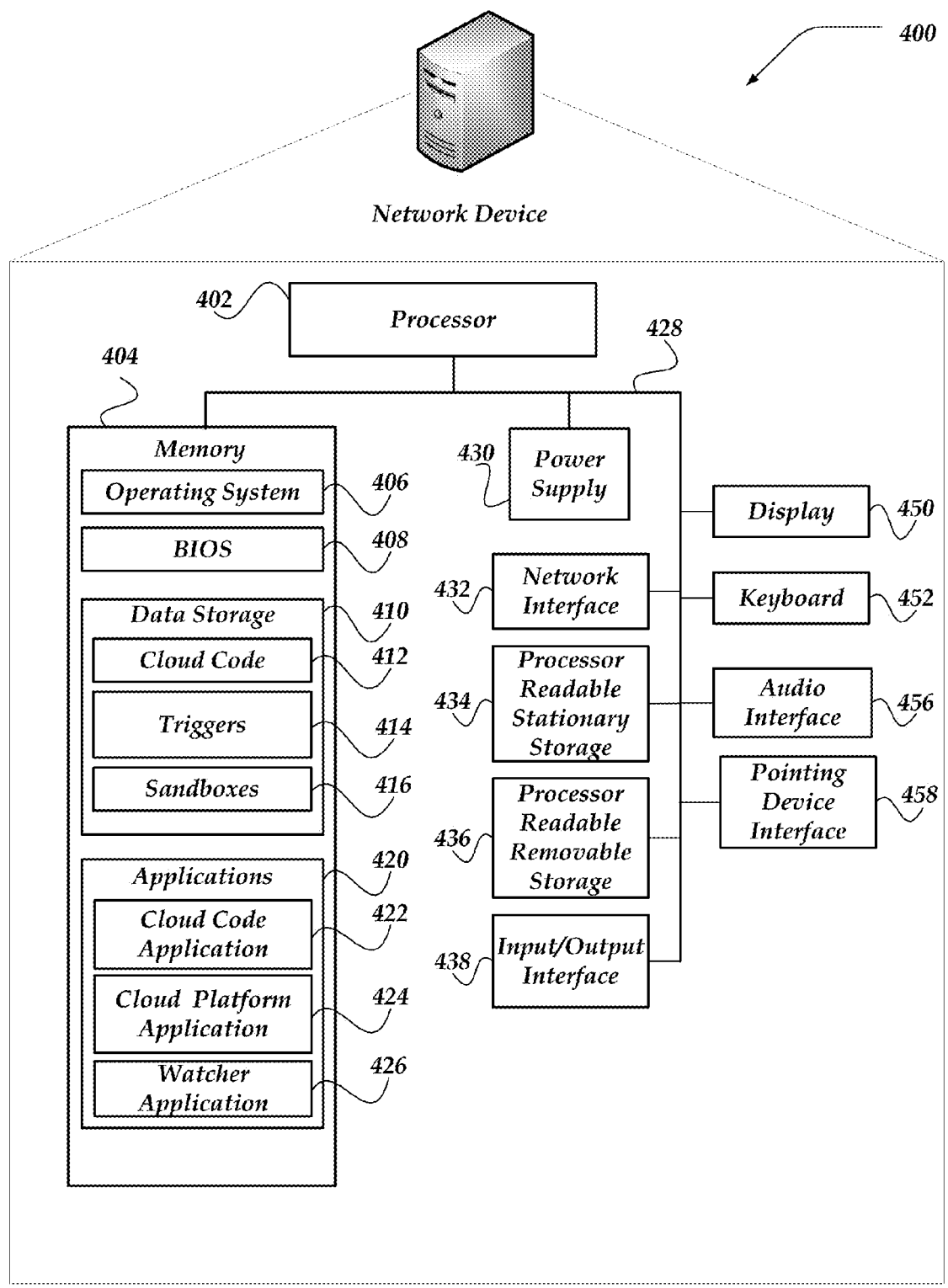
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows ® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-9. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, cloud code 412, triggers 414, or sandboxes 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include cloud code application 422, cloud platform application 424, and watcher application 426 which may be enabled to perform actions further described below in conjunction with FIGS. 5-9. In at least one of the various embodiments, while they may be illustrated here as separate applications, cloud code application 422, cloud platform application 424, or watcher application 426 may be implemented as modules and/or components of the same application. Further, in at least one of the various embodiments, cloud code application 422, cloud platform application 424, or watcher application 426 may be implemented as operating system extensions, modules, plugins, or the like.

Furthermore, in at least one of the various embodiments, cloud code application 422, cloud platform application 424, or watcher application 426 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment Likewise, in at least one of the various embodiments, virtual machines and/or virtual servers dedicated to running cloud code application 422, cloud platform application 424, or watcher application 426 may be provisioned and de-commissioned automatically.

Also, in at least one of the various embodiments, cloud code 412, triggers 414, or sandboxes 416, or the like, may located in virtual servers running in a cloud-based computing environment rather than being tied to one or more specific physical blade servers.

Illustrative Architecture for a Cloud-Based Developer Platform

In at least one of the various embodiments, a cloud platform may be a system that enables mobile application developers to enrich their mobile applications by accessing functions and services that may be provided by the cloud platform. Cloud platforms may provide a variety of pre-defined functions and API's that provide services useful to develop mobile applications. A cloud platform may provide API's that may be used in mobile application to provide services, such as, payment services, user management, data services (e.g., storage, searching, or the like), logging, or the like. By providing such services, a cloud platform may reduce the difficulty of developing mobile applications.

In at least one of the various embodiments, mobile application developers may access the services of a cloud platform by integrating their application with a cloud platform interface, such as cloud platform interface 322. In other embodiments, mobile application developers may integrate with the cloud platform services using other mechanisms, such as, web applications, web services, or the like. Also, while mobile application and mobile application developers are described, the innovations disclosed are not limited to mobile applications and/or mobile application developers. One of ordinary skill in the art will appreciate that other applications and/or application developers may be enabled to benefit from the innovations described herein.

In at least one of the various embodiments, a cloud platform may enable mobile application developers to generate application modules that include cloud code. The cloud code modules may be deployed to a cloud platform enabling additional/customized functionality for the applications to be executed on the cloud platform. In at least one of the various embodiments, mobile application developers may access the deployed cloud code in their mobile applications using specialize function calls through the cloud platform interface.

In at least one of the various embodiments, deployed cloud code may be activated on the cloud platform and may be associated with function calls, trigger points, or the like. In at least one of the various embodiments, the cloud code associated with function calls may be accessed by name from within a mobile application using a cloud platform interface. Likewise, cloud code associated with a trigger point may be executed before, during, or after, the occurrence one or more events and/or function calls that correspond to the trigger point.

In at least one of the various embodiments, the cloud platform and/or cloud platform interface may provide one or more API's that enable mobile application developers to create mobile applications that may access and/or execute deployed cloud code. For example, a mobile application developer may deploy cloud code that includes instructions that enable sending data to an external system such as, a bank. This cloud code may be deployed and associated with a function call named, for example, 'update_bank_info'. If the cloud code is successfully deployed, the application developer may enable mobile applications to employ a function with the mobile application to execute the deployed cloud code on the cloud platform. In one embodiment, a function call command may look like "cloud_platform('update_bankinfo', '12345', '100.00', 'deposit', 'Payday');" In this example, 'cloud_platform' may be an application interface function provided by the cloud platform interface enabling access to the cloud platform; 'update_bank_info' identifies the specific cloud code that should be used (e.g., the deployed cloud code that is associated with the name 'update_bank_info'); and the remainder of the terms may be input parameters that may be passed to the cloud code as it is executed on the cloud platform.

In at least one of the various embodiments, if a communication that includes a function call associate with cloud code is provided to the cloud platform, the cloud platform may validate, the cloud code call, locate the previously deployed cloud code, identify a suitable cloud code server, execute the cloud code using any supplied parameters, and provide the results to the requesting mobile application.

Many mobile development platforms may require developers to understand and develop expertise in writing software for several technology layers that may be common to mobile application development. For example, in most cases, a developer may need to have expertise with several technology layers, such as, user-interface frameworks (UI), mobile networking, server networking, application logic (mobile client and service-side), database operations, machine level (hardware and/or virtual), or the like. Some of this complexity may be mitigated by integrating with generalized cloud based services that may provide access to virtualized databases and virtualized server resources, but much of the application development complexity still remains the responsibility of the developers.

In at least one of the various embodiments, a software development kit and/or an API provided by the cloud code platform (e.g., via cloud platform interface 322) may reduce the number of technology layers required for development mobile applications. By utilizing the cloud platform developers may reduce required technology layers to the UI application layer and the cloud platform interface 322. Developers may rely on the cloud platform and/or the cloud platform interface to perform the complex actions that are normally done by other technology layers, such as, mobile networking, server, networking, application logic (mobile client and service-side), database operations, and machine level (hardware and/or virtual), or the like.

Furthermore, in at least one of the various embodiments, the cloud code produced and deployed to the cloud platform by mobile developers may also use the cloud platform interface (e.g., the cloud platform API, SDK) from within the cloud platform itself. Thus, in at least one of the various embodiments, the mobile application developers may leverage their expertise in using the cloud platform interface for developing server-side cloud code deployed for running on the cloud platform.

Figure 5:
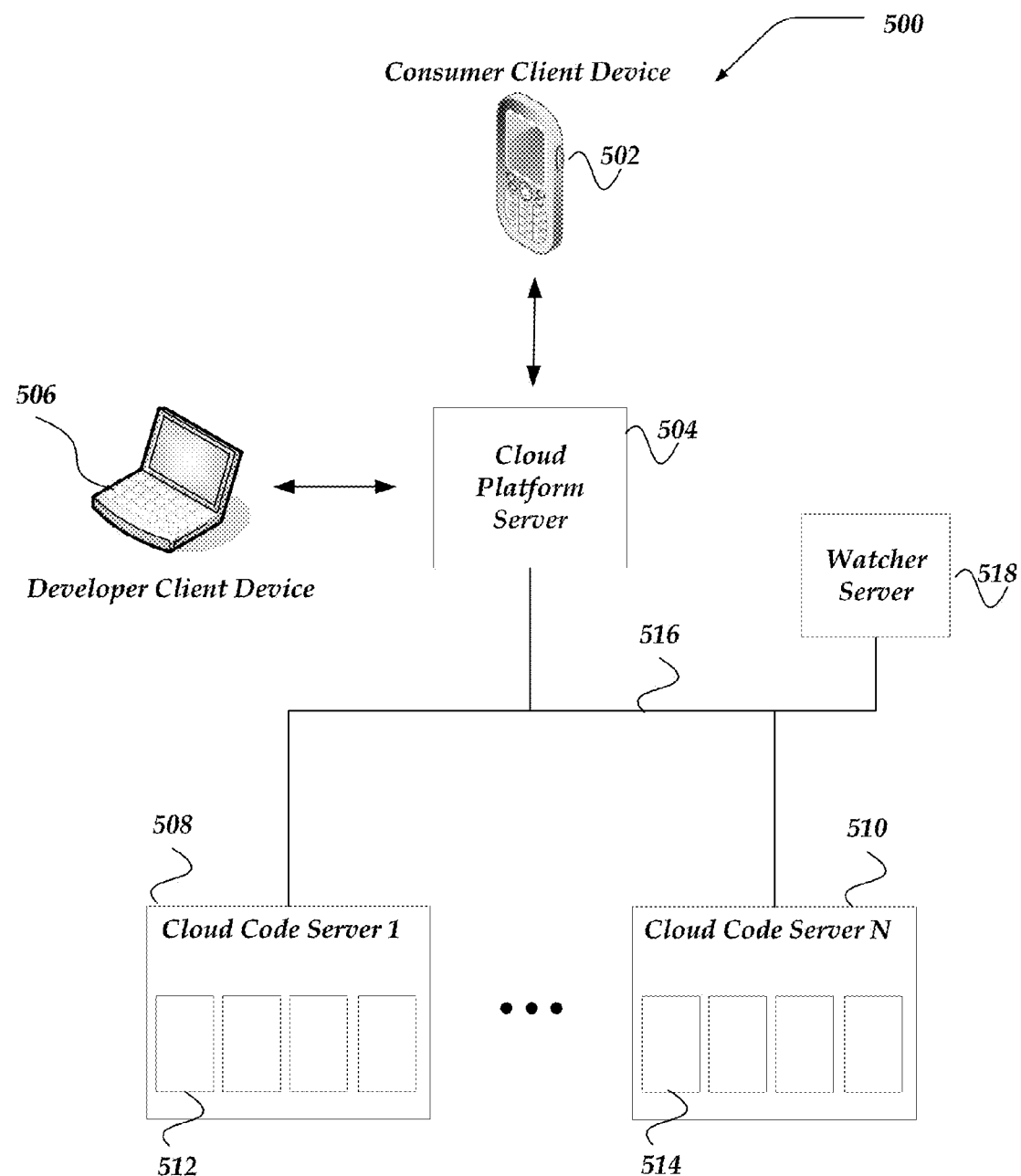
FIG. 5 illustrates a portion of a logical architecture for employing cloud code in accordance with at least one of the various embodiments.

FIG. 5 represents portions of logical architecture 500 for mobile development in a cloud-based architecture in accordance with at least one of the various embodiments. Logical architecture 500 is a non-limiting example presented to help clarify the discussion of the innovations. It is sufficient to teach the various embodiments and innovations described herein. However, one of ordinary skill in the art will appreciate that other architectures may be used without departing from the spirit and scope of the innovations disclosed herein.

In at least one of the various embodiments, consumer client device 502 may include one or more applications, such as mobile application 324, to communicate with cloud platform server 504 over a network (not shown). Consumer client device 502 may include mobile applications that employ an interface, such as cloud platform interface 322, to facilitate communication with cloud platform server 504. Further, consumer client device 502, may communicate with cloud platform server using a web browser, such as web browser 326, web applications, mobile messaging (e.g., SMS, MMS, or the like), or the like.

In at least one of the various embodiments, developer client device 506, may include one or more applications that enable communication with cloud platform server 504 including various well-known methods such as, command-line interfaces (e.g., command shells), web applications, custom GUI applications, software developer environments, or the like. Developer client device 506 may enable mobile application developers to generate cloud code and deploy it to cloud platforms. In at least one of the various embodiments, developer client device 506 may be one of a, client device 120, client device 122, client device 124, network device 400, or the like.

In at least one of the various embodiments, cloud platform server 504, may be a network device arranged to communicate with consumer client device 502 and developer client device 506 over a network. In at least one of the various embodiments, cloud platform server 504 may be operating on cloud platform server device 114, enclosure of blade servers 110, enclosure of server computers 116, blade server 250, network device 400, or the like, or combination thereof. In at least one of the various embodiments, the cloud platform server may operate as the main access point for the cloud platform.

In at least one of the various embodiments, if cloud platform server 504 is provided cloud code from a developer client device (e.g., such as developer client device 506) it may perform a variety of validation operations. If the cloud code is validated may be deployed and activated.

In at least one of the various embodiments, if a command for executing cloud code (e.g., a particular function call) is provided to cloud platform server 504, cloud platform server 504 may locate the appropriate cloud code and determine one or more cloud code servers, such as, cloud code server 508 or cloud code server 510 where the actions enabled by the cloud code may be performed.

In at least one of the various embodiments, cloud code server 508, and cloud code server 510, may be devices, such as, cloud code server device 112, enclosure of blade servers 110, enclosure of server computers 116, blade server 250, network device 400, or the like, or combination thereof. In at least one of the various embodiments, cloud code servers may include, applications such as, cloud code application 282, or cloud code application 422. In at least one of the various embodiments, cloud code server 508 and 510 may communicate to cloud platform server 504 using network 516.

In at least one of the various embodiments, there may be a plurality of cloud code servers arranged into cooperative clusters, each accessible over a network (e.g., network 516) by one or more cloud platform servers. In at least one of the various embodiments, cloud code servers may be operative on network devices separate from the cloud platform servers, or in some embodiments the cloud code servers and cloud platform servers may be operative on the same network device.

In at least one of the various embodiments, cloud code servers, such as, cloud code server 508 and cloud code server 510 may be arranged to include one or more sandboxes, such as, sandbox 512 and sandbox 514 each which may be arranged to execute cloud code.

In at least one of the various embodiments, sandboxes may be computer processes enabled to provide isolating computing environments for executing cloud code. In at least one of the various embodiments, sandboxes, such as, sandbox 512 and sandbox 514, may be arranged to guard against the harm that a malicious, unsafe, or poorly engineered selection of cloud code may cause to the larger system and/or other sandboxes. Also, sandboxes may be used to help ensure that cloud code is prevented from accessing data and/or resources without authorization.

In at least one of the various embodiments, if a cloud code server is provided cloud code, it may determine a sandbox to use for executing the provided cloud code. In at least one of the various embodiments, if there are idle sandboxes, they may be retrieved from one or more queues or pools that contain/reference sandboxes that are standing-by ready to execute cloud code. In the case that an instantiated sandbox may be unavailable, the cloud code server may instantiate a new sandbox for executing the cloud code. In at least one of the various embodiments, if the execution of the cloud code is complete, the sandbox may be returned the queue.

In at least one of the various embodiments, the cloud platform may be arranged to establish a one or more timeout values, that if exceeded cancels and/or aborts the cloud code function call. In at least one of the various embodiments, each level of operation of the cloud code function call may have a defined timeout. In at least one of the various embodiments, the timeouts may be nested, in the sense that a first overall timeout is set as each function call associated with cloud code is provided to the cloud platform. Then secondary timeouts may be set for each stage of the process. The secondary timeouts may be shorter than the first timeout and shorter than any enclosing prior secondary timeouts. For example, the first timeout may be set to seven seconds, meaning that if the function call does not complete in seven seconds it may be canceled by the cloud platform (enabling the caller to retry). Also, a secondary timeout of four seconds may be set at the cloud code server stage of the process. Thus, if the cloud code server stage does not complete within four seconds the cloud code server may cancel the operation and report the timeout to the cloud platform. Further, a secondary timeout of two seconds may be set at the sandbox level. If the sandbox timeout is exceeded the sandbox may abort the execution of the cloud code and report the timeout and any associated error codes to the cloud code server. In at least one of the various embodiments, if there is time remaining at a "higher" level, it may be used to attempt to cure the cause of the timeout below.

In at least one of the various embodiments, watcher 518 may monitor the activity and operating characteristics of one or more sandboxes (e.g., sandboxes 512, 514, or the like, one or more cloud code servers (e.g., cloud code server 508, cloud code server 510, or the like), and one or more cloud platform servers (e.g., cloud platform server 504). Watcher 518 may be operative on any computing device, such as blade server 250, network device 400, or the like, that may be enabled to run watcher application 286, watcher application 426, or the like. Further, in at least one of the various embodiments, watchers and/or the watcher application may be operative on a cloud platform server such as cloud platform server 504 rather than being on a computing device that is separate from a cloud platform server.

In at least one of the various embodiments, servers that may be monitored by the watcher may establish communication with the watcher and periodically provide messages that indicate their operational status (e.g., heartbeat message). In at least one of the various embodiments, cloud code servers may update the watcher to indicate the status of the sandboxes as well as status of the cloud code server.

In at least one of the various embodiments, status messages regarding servers such as cloud code server 508, cloud code server 510, cloud platform server 504, may include various performance metrics, such as, CPU utilization, resident memory utilization, disk paging, network throughput, or the like. In at least one of the various embodiments, status messages regarding cloud code servers may also include, metrics such as, the number of sandboxes and their status (e.g., idle, busy, error), number of cloud code transactions, or the like.

In at least one of the various embodiments, watcher 518 may be arranged to monitor sandboxes which may enable the detection of dead/frozen sandboxes, run-away sandboxes, or the like.

In at least one of the various embodiments, if watcher 518 is provided status messages that indicate one or more problems may be occurring on a cloud code server, it may initiate one or more remedial actions. Remedial actions include, resetting a sandbox, killing and deleting a sandbox process, reallocating resources, adjusting resource quotas, rebooting a cloud code server, isolating a cloud code server from the cloud platform, or the like.

Furthermore, in at least one of the various embodiments, cloud platform server 504, cloud code servers 508-510, or watcher server 518 may be operative in a cloud-based computing environment. In at least one of the various embodiments, the platform may be deployed using virtual machines and/or virtual servers that may be managed in a cloud-based based computing environment. In at least one of the various embodiments, in this context the virtual servers (e.g., cloud platform server 504, cloud code servers 508-510, or watcher server 518) may flow from one physical network device within the cloud-based environment to another depending on performance and scaling considerations that may be automatically managed by the cloud computing environment. Likewise, in at least one of the various embodiments, virtual machines and/or virtual servers dedicated to running as cloud platform server 504, cloud code servers 508-510, or watcher server 518 may be provisioned and de-commissioned automatically.

In at least one of the various embodiments, network 516 may be an embodiment of network 102, network 104, network 106, or the like. Also, in at least one of the various embodiments, network 516 may represent one or more physical networks and/or virtual networks comprising a cloud-based computing environment.

Generalized Operation

FIGS. 6-9 represent the generalized operations of mobile application development in a cloud-based architecture in accordance with at least one of the various embodiments. In at least one of the various embodiments, processes 600, 700, 800, and 900 described in conjunction with FIGS. 6-9 may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes or portions thereof may be implemented by and/or executed on one or more blade servers, such as blade server 250 of FIG. 2B. However, embodiments are not so limited and various combinations of network devices, blade servers, or the like may be utilized. Further, in at least one of the various embodiments, the processes described in conjunction with FIGS. 6-9 may be operative in cloud code platform architectures such as those described in conjunction with FIG. 5.

Furthermore, in at least one of the various embodiments, processes 600, 700, 800, and 900 may be operative in a cloud-based computing environment. In at least one of the various embodiments, these processes, applications, and components that comprise the mobile development platform may be executing in virtual machines and/or virtual servers that may be managed in a cloud-based based computing environment. In at least one of the various embodiments, in this context the processes may flow from one physical network device within the cloud-based environment to another depending on performance and scaling considerations automatically managed by the cloud computing environment. Likewise, virtual machines and/or virtual servers dedicated to running processes 600, 700, 800, and 900 may be provisioned and de-commissioned automatically.

Figure 6:
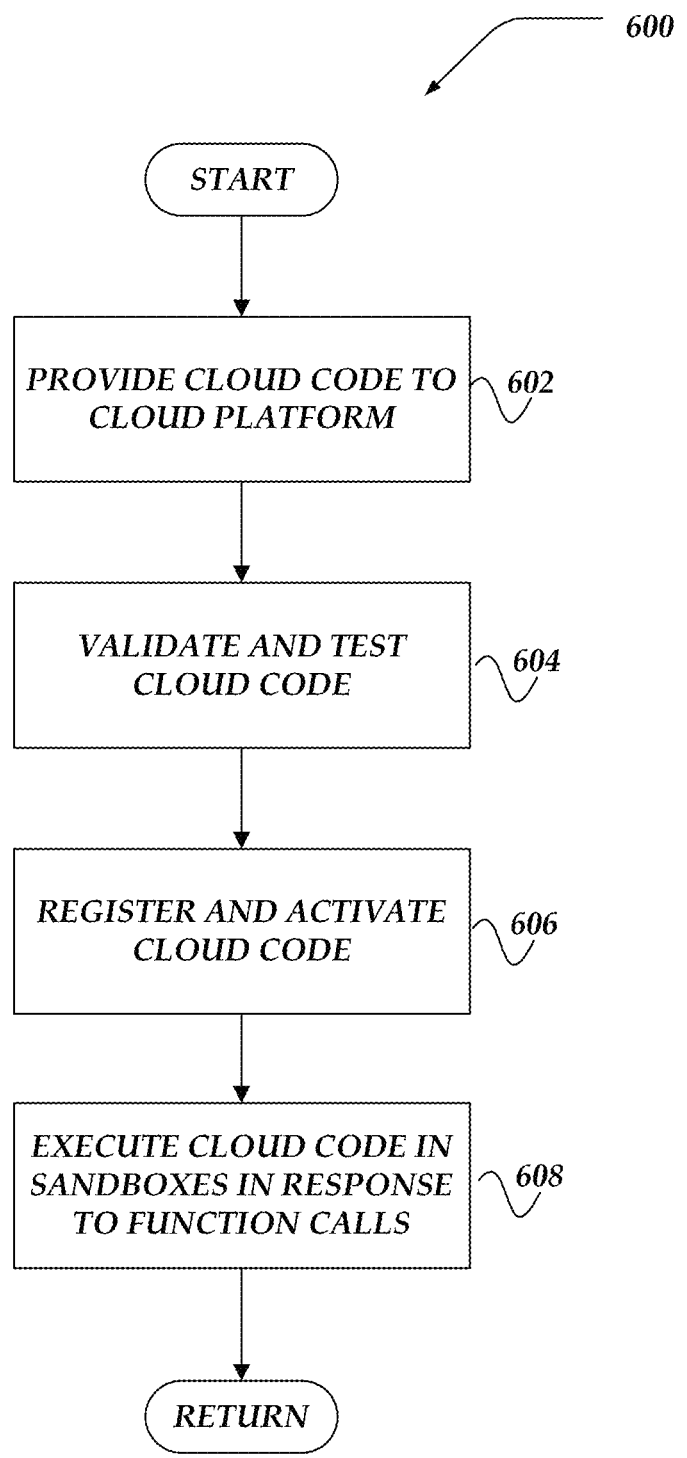
FIG. 6 shows an overview flowchart for a process for deploying cloud code in accordance with at least one of the various embodiments.

FIG. 6 shows an overview flowchart for process 600 for deploying cloud code in accordance with at least one of the various embodiments. After at start block, at block 602, cloud code may be provided to a cloud platform. In at least one of the various embodiments, the cloud platform may be operating as a cloud platform server such as, cloud platform 504.

In at least one of the various embodiments, the cloud code may be a selection of source code provided by a mobile application developer. In at least one of the various embodiments, the provided cloud code may be written in various computer programming languages such as, JavaScript, Perl, Python, Lua, C, C++, C#, or the like.

In at least one of the various embodiments, the cloud code may be provided with additional meta-data that may be used by the cloud platform and cloud code servers for determining how to process and or validate the provided cloud code. For example, cloud code may be provided with meta-data such as, developer ID, public keys (for cryptographically signed cloud code), application identifier (for mapping the cloud code to a particular application), source code language identifiers, or the like.

Next, at block 604, the cloud platform may validate and test the provided cloud code. In at least one of the various embodiments, the cloud code may be validated to help ensure that it includes syntactically correct source code. In at least one of the various embodiments, the cloud platform may determine the programming language for the cloud code and compile it using a compatible compiler. Errors detected during the compilation of the provided cloud code, if any, may indicate that the provided cloud code may not be valid. In at least one of the various embodiments, the programming language may be determined using various methods, including, scanning the cloud code to identify the language, meta-data provided with the cloud code, a configuration values, or the like, or combination thereof.

In at least one of the various embodiments, further validation may include confirming that the mobile application developer and/or the mobile application associated with the provided cloud code may be authorized to employ the cloud platform to use cloud code. For example, identifiers included with the cloud code, and/or associated with a mobile application developer may be used to lookup and/or confirm that the appropriate licensing agreements are in place, outstanding invoices (if any) are paid up, or the like.

In at least one of the various embodiments, also, the provided cloud code may be tested to determine if it conflicts with other previously provided cloud code. For example, if the provided cloud code is designated to be associated with a function call that corresponds to other previously deployed cloud code, the cloud platform may take actions, including, but not limited to, warning the application developer of the conflict, aborting the cloud code deploy operation, ignoring the conflict and overwriting the conflicting cloud code, or the like. In at least one of the various embodiments, the particular actions taken may be determined based on stored configuration information, user input, or the like.

Next, at block 606, the provided cloud code may be registered and made active for responding to requests. In at least one of the various embodiments, if the cloud code is activated, it becomes available for servicing function calls provided to the cloud platform that are associated with the provided cloud code. In at least one of the various embodiments, the cloud platform may provide a list of available/active cloud code modules and the names and parameters associated with each. In at least one of the various embodiments, such list of available cloud code modules may be filtered such that mobile application developers may view cloud code that is associated with their accounts/applications. Also, the lists of available cloud code may be further filtered based on user permissions, or the like.

In at least one of the various embodiments, the provided cloud code may be registered and associated with one or more trigger points. Trigger points may be particular states and/or conditions that may be associated with one or more cloud platform function calls, including, function calls built into the cloud platform rather than being limited to function calls associated with cloud code.

In at least one of the various embodiments, if a trigger point is encountered during operation, function calls (including cloud code function calls) registered with the trigger point may be executed. In at least one of the various embodiments, common trigger points may include, "before", "after, "on-save", "on-delete", "on-create", "on-error", or the like.

In at least one of the various embodiments, cloud code that enables application specific processing may be registered with one or more trigger points. For example, registering cloud code with the trigger point "after" for a function call such as "saveNewUser" may enable the registered cloud code to be selected and executed after the function call "saveNewUser" completes. Likewise, cloud code registered with the trigger point "before" for the same function call may be executed automatically each time "saveNewUser" function is called, but it may be executed before the called function is executed.

Also, in at least one of the various embodiments, the mobile application developer that provides the cloud code may indicate that the cloud code may be shared to other users and/or mobile application developers rather than being restricted to the mobile application developer that was responsible for deploying the cloud code. Also, in at least one of the various embodiments, sharing cloud code may trigger enhanced/additional validation and authorization of the cloud code.

In at least one of the various embodiments, shared cloud code may enable third parties to integrate their services with the cloud platform and/or the mobile applications.

At block 608, the cloud platform may be provided requests by way function calls associated with cloud code to use cloud code that may be executed in one or more sandboxes. The results of executing the cloud code may be provided to the mobile applications that provided the function calls Likewise, errors, authentication failures, timeouts, or the like, may be reported, and/or logged, based on configuration settings, or the like.

Figure 7:
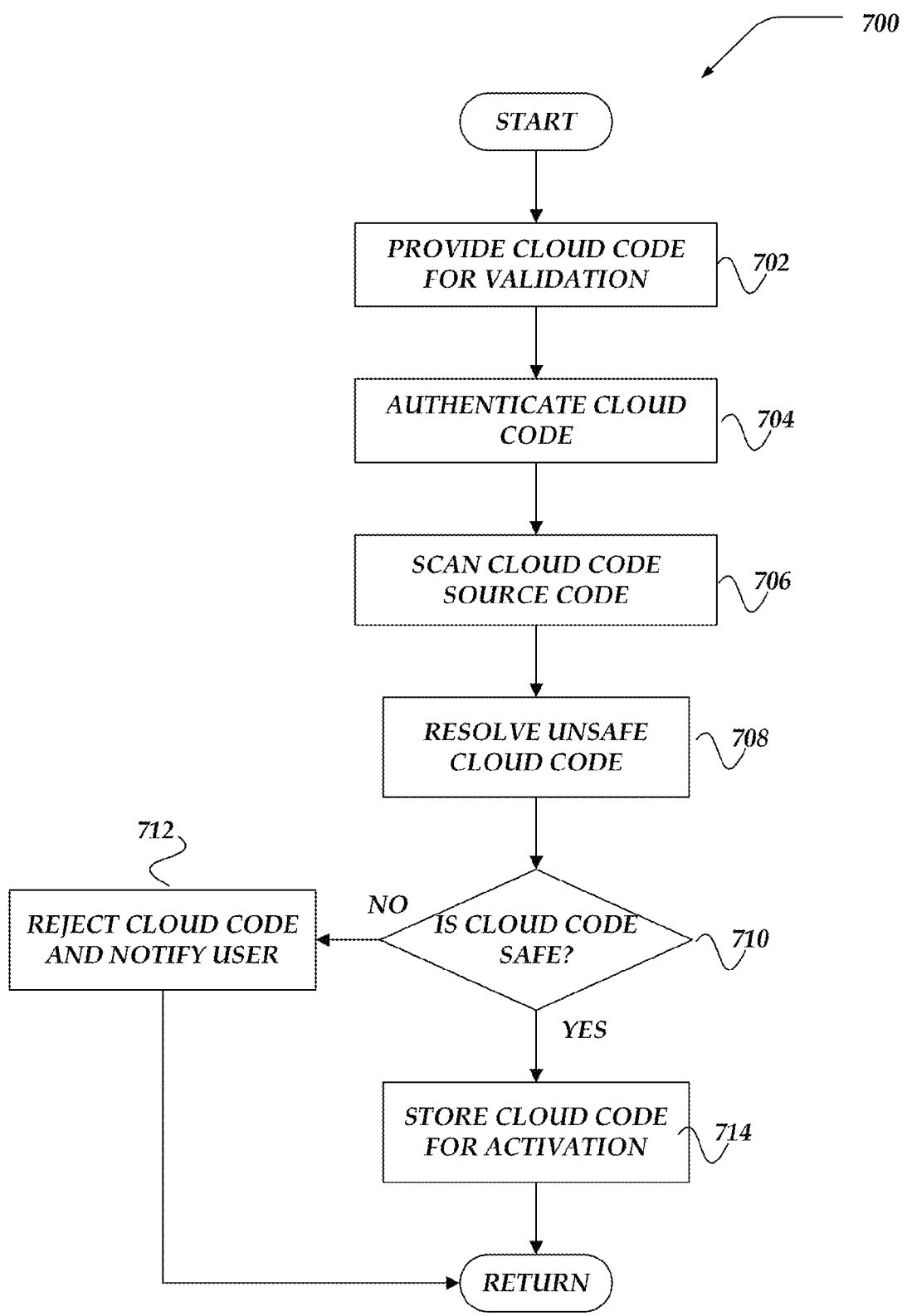
FIG. 7 shows a flowchart for a process for validating cloud code in accordance with at least one of the various embodiments.

FIG. 7 shows a flowchart for process 700 for validating cloud code in accordance with at least one of the various embodiments. After a start block, at block 702, cloud code may be provided for validation. In at least one of the various embodiments, the cloud code may be provided to a cloud platform server, such as cloud platform server 504, from a mobile application developer.

At block 704, the provided cloud code may be authenticated. In at least one of the various embodiments, the cloud code may be authenticated based on credentials associated with the user that may be deploying the cloud code. Credentials may be included with the provided cloud code (in meta-data) or they may be based on session information associated with the user that is deploying the cloud code. For example, user may provide a username and password at the beginning of the cloud code deployment process to establish user credentials. Of course, other well-known credentialing techniques may be used, such as cryptographic signing, security certificates, or the like.

In at least one of the various embodiments, at least a portion of the supplied credentials may be employed by the cloud code platform to determine if the user has the appropriate privileges for enabling the deployment of the provided cloud code. In at least one of the various embodiments, if the privileges may be insufficient and/or incorrect, further action may be taken, including, requesting that additional credentialing information be provided, rejecting the provided cloud code, logging the authentication failure, or the like, or combination thereof.

Next, at block 706, the provided cloud code may be scanned to detect if it may include unsafe source code that may be recognized as having one or more undesirable and/or unsafe characteristics, such as, the potential to cause performance problems, attempts to access reserved resources, use of reserved words, attempted access of unauthorized software/system libraries, or the like.

In at least one of the various embodiments, one or more techniques may be employed to validate the provided cloud code. In at least one of the various embodiments, more or less techniques may be used depending defined policies that may be based on configuration values, or other sources.

In at least one of the various embodiments, the cloud code may be scanned to identify code patterns that may indicate unsafe behavior, such as, unbounded recursion, infinite loops, excessive memory allocation, or the like. Unsafe code is not limited to the deliberate attempts to disrupt the cloud platform; mobile application developers may unwittingly introduce cloud code that includes unsafe code.

In at least one of the various embodiments, the cloud code module contents may be examined to see if the number of network access system calls exceeded a define threshold. The threshold value may be defined using configuration values, or the like.

In at least one of the various embodiments, additional tests may include estimating the probability that the function call will timeout before completion. In at least one of the various embodiments, estimating the probability of timing out may be done by keeping a record of one or more previously provided source code patterns that have resulted in timeouts. If provided cloud code includes one or more of the recognized patterns it may be deemed unsafe.

In at least one of the various embodiments, various techniques such as pattern matching, heuristics, or the like, may be employed to identify unsafe code. In at least one of the various embodiments, a cloud platform application may parse the provided cloud code to identify loops that have the potential to be unbounded. For example, a loop that is bounded by the value of a passed in parameter may be determined unsafe if the value of the passed in from client application has the potential to very large. Likewise, cloud code that includes recursion that has the potential for unbounded (or near unbounded) recursion depth may also be determined to be unsafe.

In at least one of the various embodiments, cloud code that makes network calls to the cloud platform may also be determined to be unsafe based on its potential for consuming the resources of many sandboxes if many and/or recursive cloud platform-to-cloud platform network calls are made.

In at least one of the various embodiments, particular system/library calls inherent in the programming language used write the provided cloud code (or its runtime environment) may be deemed unsafe if they are included in the cloud code. For example, a cloud platform may be configured to prevent local resources, such as files, from being accessed from within a sandbox, thus if the provided cloud code includes functions for accessing protected local resources, even though the files access call are standard to the cloud code's programming language, that cloud code may be determined to be unsafe.

In at least one of the various embodiments, the provided cloud code may be compiled by a compatible compiler. Errors detected during compile time may be considered during the validation of the provide cloud code.

Next, at block 708, the cloud platform may perform one or more actions to repair unsafe provided cloud code. In at least one of the various embodiments, the methods used to repair unsafe cloud code may be based on policies and/or business rules that may be defined using configuration values (e.g., retrieved from configuration files, configuration databases, input at a user-interface, or the like).

In at least one of the various embodiments, for a given unsafe condition, policies may be set to reject the provided cloud code and report that the cloud code is invalid, and optionally supply the reason to the mobile application developer.

In at least one of the various embodiments, the portions of the unsafe provided cloud code may be replaced by safe code. In at least one of the various embodiments, fail safe conditions may be inserted into loops and recursions that have to potential to be unbounded. For example, the cloud platform may insert a test inside a loop to establish a predefined upper bound.

In at least one of the various embodiments, sandboxes designed to execute the cloud code may include one or more runtime engines and/or compilers for compiling the provided cloud code and/or executing it. These runtime engines and/or compliers may be compatible with the programming language comprising the cloud code. In at least one of the various embodiments, they may include modifications that enable the cloud platform to add failsafe/safety code to the cloud code during compilation/execution. Thus, in at least one of the various embodiments, the cloud platform compilers may insert object code that guards against run-away loops, unbounded recursion, excessive memory allocations, or the like.

Further, in at least one of the various embodiments, the runtime engines/compilers may be arranged to silently override standard operations normally available in a runtime engine and/or in a programming language. Additional safety precautions may be included in the overridden functions to enable otherwise unsafe cloud code to be safer.

In at least one of the various embodiments, if a computer language used by provided cloud code enables unbounded (unsafe) memory allocation, the implementation of the cloud platform runtime-engine/compiler may be modified to include built-in memory allocation limits.

Likewise, in at least one of the various embodiments, if a cloud code computer language enables memory buffers to be overwritten, the cloud platform runtime-engine/compile may be modified to guard against over writing buffers.

In at least one of the various embodiments, the cloud platform may enable users with sufficient permissions and/or authority to over ride one or more determinations that the cloud code is unsafe. This enables users to review the source code of cloud code and override the cloud platform validation process as necessary.

At decision block 710, if the provided cloud code is determined to be safe, control may flow to block 714. Otherwise, in at least one of the various embodiments, control may flow to block 712.

At block 712, because the cloud code remains unsafe it may be rejected and the user attempting to deploy the cloud code may be notified of the rejection. Next, control may be returned to a calling process.

In at least one of the various embodiments, a record may be kept of the why the cloud code was determined to unsafe and which application developer provided the cloud code. In at least one of the various embodiments, if mobile application developers provide unsafe cloud code a number of time that exceed a defined threshold, those mobile application developers may temporarily or permanently barred from the cloud platform.

At block 714, if the actions performed in block 708 have resolved the issues (if any) that made the cloud code unsafe, the provided cloud code may be registered and activated for execution and control may be returned to a calling process.

Figure 8:
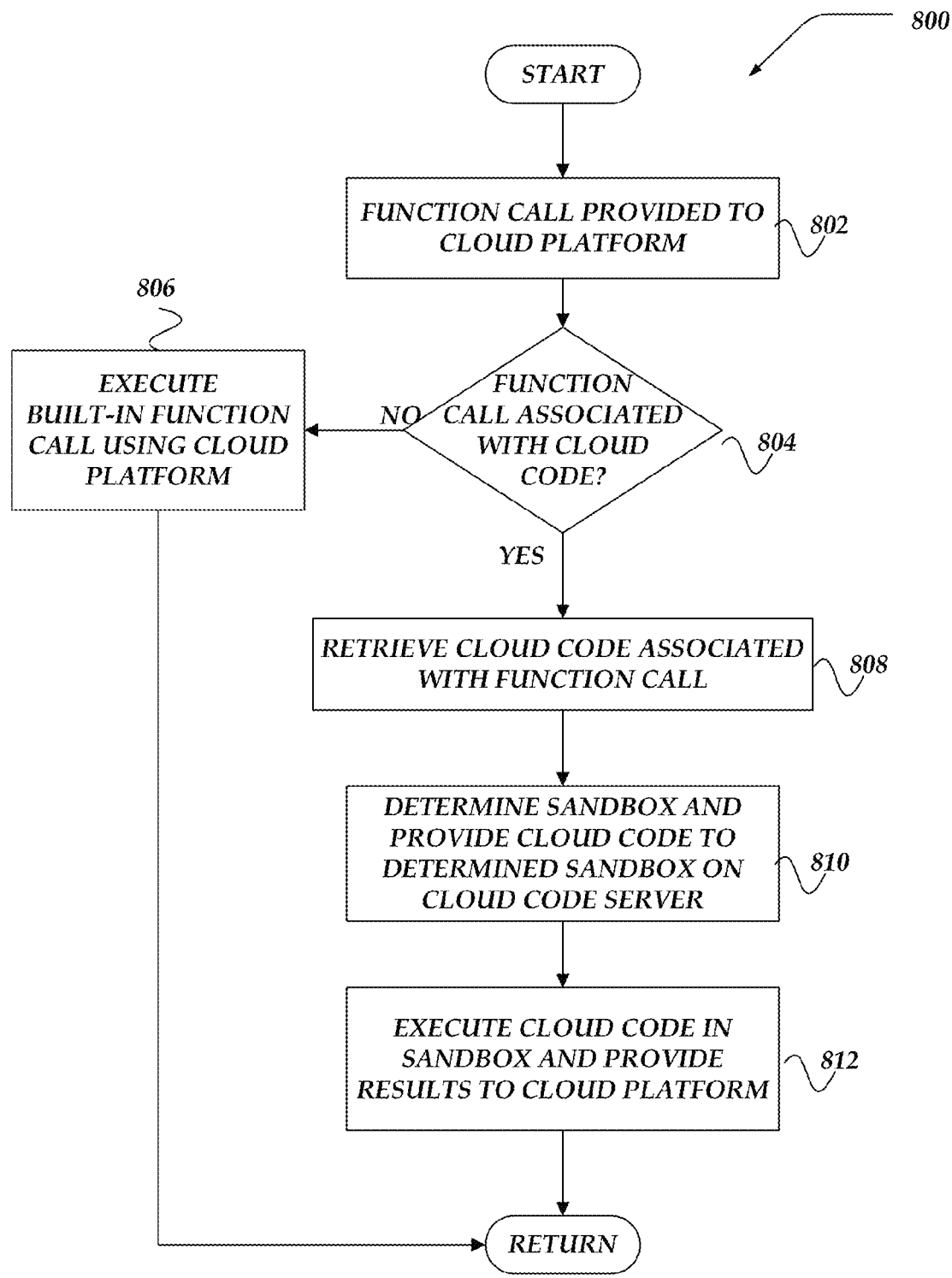
FIG. 8 shows a flowchart for a process for resolving a function call using cloud code in accordance with at least one of the various embodiments.

FIG. 8 shows a flowchart for process 800 for resolving a function call using cloud code in accordance with at least one of the various embodiments. After a start block, at block 802, a function call may be provided to the cloud platform. In at least one of the various embodiments, the function call may be from a client device such as client device 300. Further, in at least one of the various embodiments, the function call may be initiated by a mobile application, such as mobile application 324 using a cloud platform interface, such as, cloud platform interface 322.

In at least one of the various embodiments, the function call may be a request sent over network and it may be provided in one or more well-known formats, such as, JSON, XML, SOAP, HTML, or the like. In at least one of the various embodiments, the function call may include various elements including, a function identifier (e.g., function name), parameters supplied for the function call, or the like. In at least one of the various embodiments, meta-data may be provided for scoping the function call to various domains, such as, a particular mobile application, classes of mobile applications, users, user groups, mobile application developers, or the like, or combination thereof.

At decision block 804, if the function call is determined to be linked and/or associated with to cloud code, control may flow to block 808. Otherwise, in at least one of the various embodiments, control may flow to block 806.

In at least one of the various embodiments, a function call may be associated with a particular function name, or other function identifier that was determined when the cloud code was deployed and registered. In these embodiments, the cloud platform may determine the cloud code associated with the function call based on a mapping between the function name or other identifier and the registered cloud code.

Also, in at least one of the various embodiments, the cloud code may be linked to the function call if the cloud code is registered with a trigger point that may occur before, during, or after the function call executes. In at least one of the various embodiments, one or more operations, including cloud code function calls, may be associated with one or more trigger points.

At block 806, the function call may be executed by the cloud platform. In at least one of the various embodiments, function calls not linked to cloud code may be implemented as built-in features of the cloud platform. Built-in function calls may be executed by the cloud platform absent interaction with cloud code. But, built-in function calls may be associated with one or more trigger points that may have cloud code associated with them. Thus, in at least one of the various embodiments, executing a built-in function call may result in one or more cloud code function calls being triggered and executed. Next, if the built-in function call runs to completion control may be returned to a calling process.

At block 808, the cloud code linked and/or associated with the function call may be retrieved. In at least one of the various embodiments, cloud code may be stored and/or located in a database, file system, or the like, and may be retrieved from storage by the cloud platform application using techniques well-known to one of ordinary skill in the art.

In at least one of the various embodiments, depending on the type of programming language comprising the cloud code and/or one or more configuration settings, the cloud code may be stored as source code, object code, or executable code. Next, control may flow to block 810.

At block 810, the cloud platform may determine a sandbox and/or a cloud code server where the cloud code may be provided. In at least one of the various embodiments, the cloud platform may be associated with one or more cloud code servers. Each cloud code server may communicate with the cloud platform over a network to indicate if it is available and/or ready to execute cloud code.

In at least one of the various embodiments, the cloud platform may determine a particular sandbox for running the cloud code. In other embodiments, the cloud platform may determine the cloud code server and let the cloud code server determine which sandbox to use.

In at least one of the various embodiments, the cloud platform may employ one or more load balancing techniques to help ensure that the determined cloud code servers have resources available for executing the cloud code. In at least one of the various embodiments, cloud code servers may report their current load status and/or availability to the cloud platform server. Thus, a combination of randomized distribution and the load status reported by the cloud code server may be employed to determine which cloud code server may be provided the cloud code. For example, if the there are five available cloud code servers, and two of the cloud code servers report that they are over utilized and three report that they are underutilized, the cloud platform may distribute the cloud code to one of the underutilized cloud code servers for execution.

At block 812, the cloud code may be provided to the determined cloud code server for execution in sandbox. In at least one of the various embodiments, the cloud code may be provided from the cloud platform server to the determined cloud code server.

Also, in at least one of the various embodiments, the cloud platform server may communicate the cloud code location (and identity) to the cloud code server which may be arranged to retrieve the cloud code directly. In at least one of the various embodiments, if the cloud code server is located separate from the cloud platform server, the cloud code may be provided over a network.

In at least one of the various embodiments, the cloud code server may determine a sandbox for executing the provided cloud code. In at least one of the various embodiments, idle sandboxes compatible with the cloud code may be standing-by in a queue, or, in at least one of the various embodiments, a sandbox compatible with the provided cloud code may be instantiated.

In at least one of the various embodiments, the provided cloud code may be provided to the determined sandbox. In at least one of the various embodiments, if the cloud code is source code the sandbox may compile the cloud code into object code. If the cloud code is ready for execution the sandbox may execute the cloud code using any relevant parameters and/or meta-data that may be associated with the cloud code.

In at least one of the various embodiments, the cloud platform may be arranged provide one or more cloud platform objects, such as, user profiles, context object, session variables, or the like. One or more of these objects may be made available by the cloud platform to the cloud code running in a sandbox. Depending on the runtime environment for the cloud code, the objects and/or there values may be passed in as implicit function call parameters, or they may be instantiated within the runtime environment of the sandbox.

In at least one of the various embodiments, if the execution of the cloud code finishes, a return code (e.g., success/failure) may be generated and provided to the cloud code server. Also, if the execution of the cloud code produces a result set, the sandbox may provide the result set to the cloud server. In at least one of the various embodiments, result sets may be provided in various formats, including XML, JSON, or the like.

In at least one of the various embodiments, the cloud code server may provide the return codes and result sets to the cloud platform server. The cloud platform server may further provide them to the mobile application that provided the function call that was associated with the cloud code. Alternatively, in at least one of the various embodiments, the cloud code server may provide the results to the mobile application directly. Next, in at least one of the various embodiments, control may be returned to a calling process.

Figure 9:
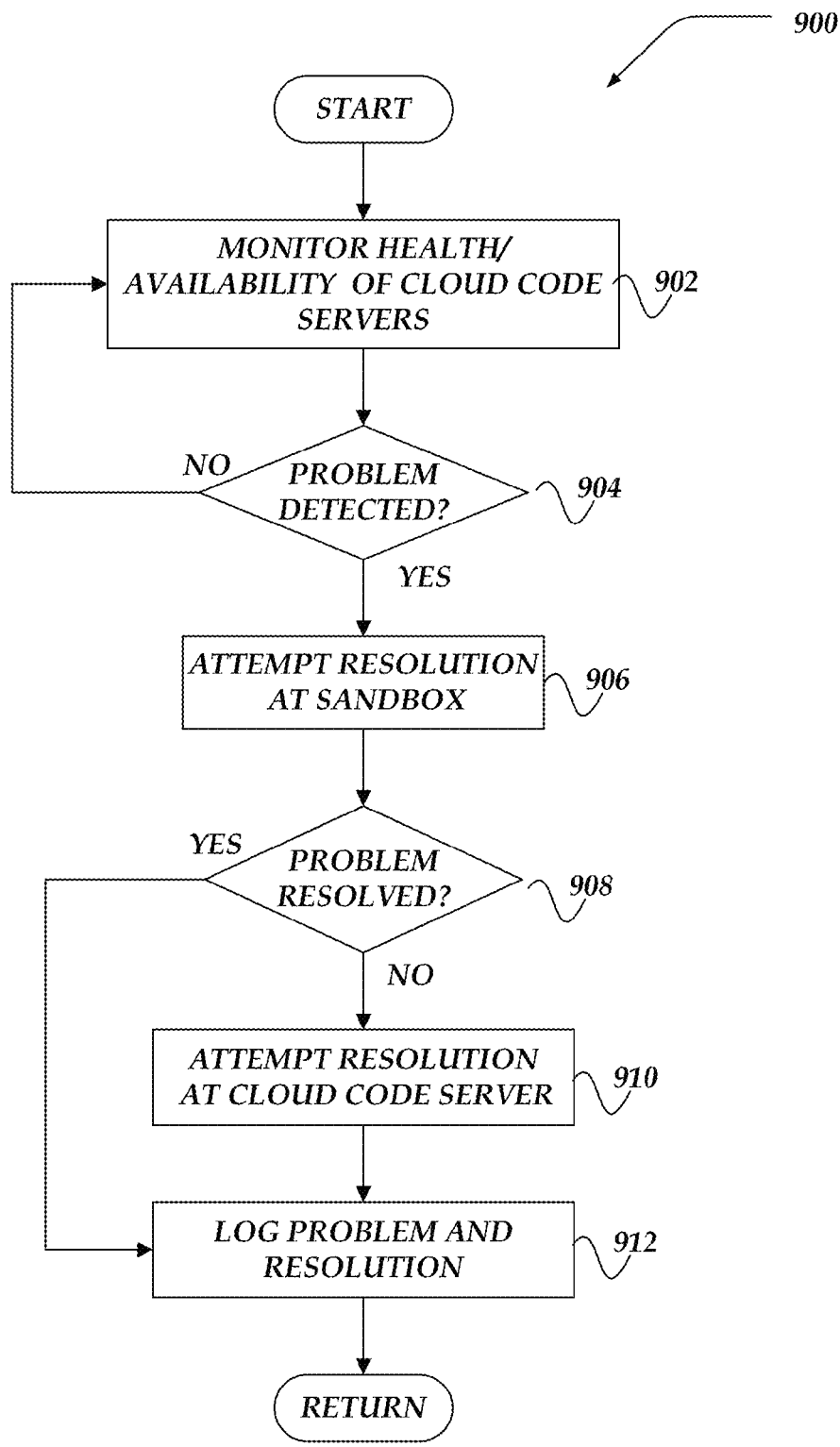
FIG. 9 shows a flowchart for a watcher process in accordance with at least one of the various embodiments.

FIG. 9 shows a flowchart for watcher process 900 in accordance with at least one of the various embodiments. In at least one of the various embodiments, a watcher process may be operative on a cloud platform server, or it may be separate from the cloud platform server.

In at least one of the various embodiments, a watcher process may be arranged to monitor the availability and activity of cloud code servers and provide that information as necessary to the cloud platform server. In at least one of the various embodiments, cloud platform servers may employ the information provided by the watcher process if determining which cloud code server and/or sandbox to use if responding to function calls associated with cloud code.

After a start block, at block 902, a watcher process may monitor the operational health and/or availability of one or more cloud code servers. In at least one of the various embodiments, the watcher may monitor various performance metrics such CPU utilization, memory user, thread/process count, load level, disk space, swapping, network connection, or the like.

In at least one of the various embodiments, the watcher may be provided performance metrics by the cloud code server. Likewise, in at least one of the various embodiments, a watcher client agent that collects and provides the performance metrics may be deployed on each cloud code server.

At decision block 904, if a problem with one or more of the cloud code servers is detected, control may flow to block 906. Otherwise, control may loop back to block 902 so monitoring may continue.

At block 906, the watcher may perform actions to resolve the detected problem at the sandbox level. In at least one of the various embodiments, the sandbox may be instrumented so that the watcher may trigger the sandbox to cancel the operation that may be causing the problem. In at least one of the various embodiments, alternatively, if the sandbox lacks sufficient instrumentation interfaces to resolve the problem, or the problem otherwise fails to be resolved, the watcher may signal for the cloud code server to terminate the sandbox that was causing the problem.

At decision block 908, if the problem may be resolved control may move to block 912. Otherwise, in at least one of the various embodiments, control may continue to the block 910.

At block 910, the watcher may attempt to resolve the problem at the cloud code server. In at least one of the various embodiments, this may include killing and/or restarting one or more processes that may be running on the cloud code server. In at least one of the various embodiments, it may include taking action such as allocating additional memory, CPU resources, disk space, or the like, for the cloud code server.

In at least one of the various embodiments, if the watcher is unable to resolve the problem, the cloud code server may be re-booted. If the cloud code server has been re-booted but it causes still problems it may be removed/isolated from the set of available cloud code servers.

At block 912, the detected problem and corresponding actions taken to resolve the problem may be logged preserving the event(s) and its resolution for future review. In at least one of the various embodiments, if the termination of sandboxes or the resetting of cloud code servers interrupts the operation of cloud code function calls, one or more of the cloud code function calls may be retried by the cloud platform. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

What is claimed as new and desired to be protected by Letters Patent of the United States is:

1. A computer-implemented method comprising:
   receiving, at a cloud platform device, a cloud code module from a client device:
   validating at least a portion of content or the cloud code module by the cloud platform device:
   activating the validated portion of content of the cloud code module to make the validated portion available to respond to requests;
   associating the activated portion of the cloud code module with a trigger point that is associated with a function call directed to services provided by the cloud platform device, wherein subsequent communications from a mobile application includes a call to the function call configured to execute the cloud code module:
   receiving the call to the function call associated with the trigger point from the mobile application;
   identifying at least one of a plurality of sandboxes in which to execute the activated portion of the cloud code module in response to receiving the function call; and
   executing the portion of the cloud code module associated with the trigger point in the identified sandbox according to the trigger point.

2. The computer-implemented method of claim 1, wherein a trigger point is a particular state associated with one or more cloud platform function calls.

3. The computer-implemented method of claim 1, wherein the associated function call is built into the cloud platform, the method further comprising:
   executing the cloud code module when the trigger point that is associated with the function call is encountered.

4. The computer-implemented method of claim 1, wherein a trigger point is a particular condition associated with one or more cloud platform function calls.

5. The computer-implemented method of claim 1, wherein the associated function call is a cloud code module, the method further comprising:
   executing the cloud code module when the trigger point that is associated with the function call is encountered.

6. The computer-implemented method of claim 1, wherein a trigger point causes the cloud code module to be executed before the associated function call, or after the associated function call.

7. The computer-implemented method of claim 6, wherein executing the cloud code module further comprises generating a result to be provided to a mobile application over a network.

8. A cloud platform device, comprising:
   a memory that is operative to store at least instructions; and
   a processor device communicatively coupled to the memory, the processor device operative to execute instructions to:
   receive from a client device a cloud code module at the cloud platform device;
   validate at least a portion of content or the cloud code module by the cloud platform device;
   associate the activated portion of the cloud code module with a trigger point that is associated with a function call directed to services provided by the cloud platform device, wherein subsequent communications from a mobile application includes a call to the function call configured to execute the cloud code module;
   identify at least one of a plurality of sandboxes in which to execute the activated portion of the cloud code module in response to receiving the function call; and
   execute the portion of the cloud code module associated with the trigger point in the identified sandbox according to the trigger point.

9. The cloud platform device of claim 8, wherein a trigger point is a particular state associated with one or more cloud platform function calls.

10. The cloud platform device of claim 8, wherein the associated function call is built into the cloud platform, and the processor device operative to execute the cloud code module when the trigger point that is associated with the function call is encountered.

11. The cloud platform device of claim 8, wherein a trigger point is a particular condition associated with one or more cloud platform function calls.

12. The cloud platform device of claim 8, wherein the associated function call is a cloud code module, and the processor device operative to execute the cloud code module when the trigger point that is associated with the function call is encountered.

13. The cloud platform device of claim 8, wherein the cloud code module is executed, when the trigger point is encountered, before the associated function call, or after the associated function call.

14. A non-transitory computer-readable storage medium having instructions stored therein that, when executed by a hardware processor, cause a system to:
   receive from a client device a cloud code module at the cloud platform device;
   validate at least a portion of content of the cloud code module.by the cloud platform device;
   associate the activated portion of the cloud code module with a trigger point that is associated with a function call directed to services provided by the cloud platform device, wherein subsequent communications from a mobile application includes a call to the function call configured to execute the cloud code module;
   receiving the call to the function call associated with the trigger point from the mobile application;
   identify at least one of a plurality of sandboxes in which to execute the activated portion of the cloud code module in response to receiving the function call; and
   execute the portion of the cloud code module associated with the trigger point in the identified sandbox according to the trigger point.

15. The medium of claim 14, wherein a trigger point is a particular state associated with one or more cloud platform function calls.

16. The medium of claim 14, wherein the associated function call is built into the cloud platform, and the instructions cause the system to execute the cloud code module when the trigger point that is associated with the function call is encountered.

17. The medium of claim 14, wherein a trigger point is a particular condition associated with one or more cloud platform function calls.

18. The medium of claim 14, wherein the associated function call is a cloud code module, and the instructions cause the system to execute the cloud code module when the trigger point that is associated with the function call is encountered.

19. The medium of claim 18, wherein the instructions that cause the system to execute the cloud code module generate a result to be provided to a mobile application over a network.

20. The medium of claim 14, wherein the instructions cause the system to execute the cloud code module, when the trigger point is encountered, before the associated function call, or after the associated function call.

* * * * *

UNITED STATES PATENT AND TRADEMARK OFFICE
CERTIFICATE OF CORRECTION

PATENT NO. : 9,990,267 B2
APPLICATION NO. : 14/878494
DATED : June 5, 2018
INVENTOR(S) : Shyamsundar Jayaraman et al.

Page 1 of 1

It is certified that error appears in the above-identified patent and that said Letters Patent is hereby corrected as shown below:

In the Specification

Column 12, Line 48, replace "USBTM" with -- USB™ --.

Column 27, Line 22, replace "content or the" with -- content of the --.

Column 27, Line 23, replace "device:" with -- device; --.

Column 27, Line 32, replace "module:" with -- module; --.

Column 28, Line 6, replace "content or the" with -- content of the --.

In the Claims

Column 28, Line 48, replace "module.by" with -- module by --.

Signed and Sealed this
Seventh Day of August, 2018

Andrei Iancu
*Director of the United States Patent and Trademark Office*